United States Patent
Pozzi et al.

(10) Patent No.: US 10,065,741 B1
(45) Date of Patent: Sep. 4, 2018

(54) ILLUMINATED LITERATURE POCKET FOR AIRCRAFT PASSENGER SEAT

(71) Applicant: B/E Aerospace, Inc., Wellington, FL (US)

(72) Inventors: Alexander N. Pozzi, Winston-Salem, NC (US); Glenn A. Johnson, Rural Hall, NC (US); Jeffrey W. Hontz, Winston-Salem, NC (US); Jara Freeman, Wellington, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/484,845

(22) Filed: Apr. 11, 2017

(51) Int. Cl.
| | |
|---|---|
| *A47B 39/00* | (2006.01) |
| *A47B 83/02* | (2006.01) |
| *B64D 11/06* | (2006.01) |
| *B60Q 3/20* | (2017.01) |
| *B60Q 3/41* | (2017.01) |
| *B60Q 3/70* | (2017.01) |
| *B64D 11/00* | (2006.01) |

(52) U.S. Cl.
CPC ............ *B64D 11/0627* (2014.12); *B60Q 3/20* (2017.02); *B60Q 3/41* (2017.02); *B60Q 3/70* (2017.02); *B64D 11/0638* (2014.12); *B64D 2011/0053* (2013.01)

(58) Field of Classification Search
CPC ........ B64D 2011/0053; B64D 11/0627; B64D 11/0638; B60Q 3/20; B60Q 3/70; B60Q 3/41
USPC ....................................................... 297/163
See application file for complete search history.

(56) References Cited

U.S. PATENT DOCUMENTS

| | | | |
|---|---|---|---|
| 3,019,050 A * | 1/1962 | Spielman ........... | B64D 11/0015 297/188.04 |
| 5,813,354 A | 9/1998 | Scott | |
| 6,085,666 A | 7/2000 | Anderson et al. | |
| 7,909,398 B2 | 3/2011 | Ling | |
| 8,020,936 B2 | 9/2011 | Asami et al. | |
| 8,613,479 B2 | 12/2013 | Schürg et al. | |
| 9,409,515 B2 | 8/2016 | Salter et al. | |
| 9,511,862 B2 | 12/2016 | Thiele et al. | |
| 2011/0174926 A1 * | 7/2011 | Margis ................... | B60N 3/004 244/118.6 |
| 2015/0108798 A1 | 4/2015 | Boyer, Jr. | |
| 2015/0109455 A1 | 4/2015 | Pang | |
| 2015/0296633 A1 | 10/2015 | Murata et al. | |

FOREIGN PATENT DOCUMENTS

| | | |
|---|---|---|
| CN | 204028757 U | 12/2014 |
| FR | 2981893 A1 | 5/2013 |

OTHER PUBLICATIONS

International Search Report, and Written Opinion of corresponding International Application No. PCT/US2017/027012; dated Jun. 27, 2017; 10 pages.

* cited by examiner

*Primary Examiner* — Mark R Wendell
(74) *Attorney, Agent, or Firm* — Clements Bernard Walker PLLC

(57) ABSTRACT

A passenger seat that includes a seat bottom and a seat back having a literature pocket extending across a width of the seat back above a stowed aircraft passenger tray table. A light fixture powered by an electrical circuit is mounted on the literature pocket and adapted to direct light into a space directly aft of the seat back for use by an aft-seated passenger.

13 Claims, 2 Drawing Sheets

ILLUMINATED LITERATURE POCKET FOR AIRCRAFT PASSENGER SEAT

TECHNICAL FIELD AND BACKGROUND OF THE INVENTION

Figure 1:
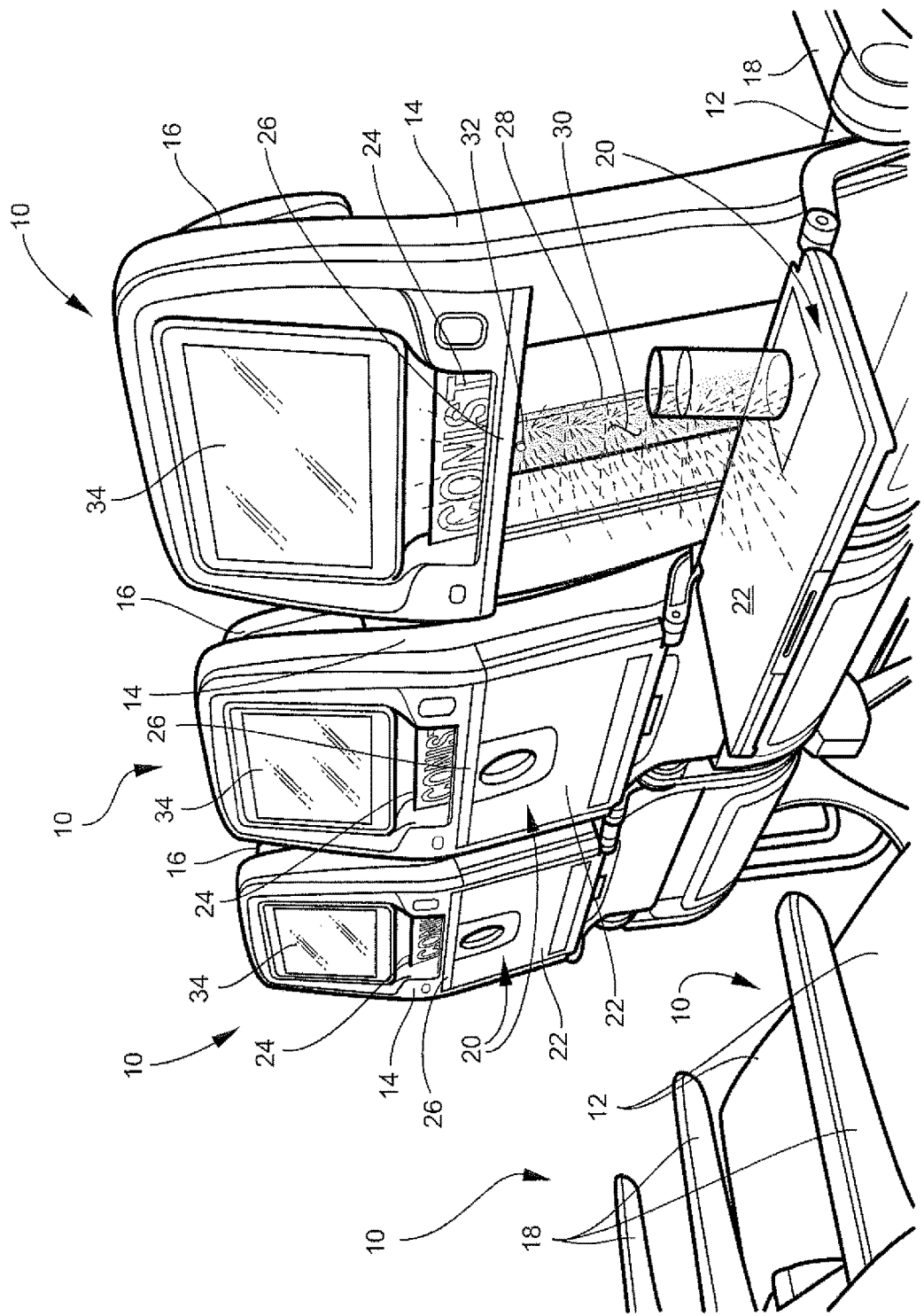

This invention relates to aircraft passenger seats, and more specifically to an aircraft passenger seat back tray table and literature pocket. Many aircraft passenger seats have literature pockets that are positioned below the tray table. Typically, these pockets extend across the width of the seat back and are spring-loaded so that the pocket can be pulled open by a passenger seated aft of the seat back, literature inserted or removed and then released to allow the pocket to spring closed. These pockets are sometimes hard to reach, particularly when the seat back is reclined.

More recently, some seats are provided with literature pockets that are positioned just below the headrest. A lateral retention bar extends from one side of the seat back to the other side, behind which is provided a space sufficient to hold magazines, flight information cards, newspapers, etc. The tray table that serves the aft-seated passenger is mounted on or adjacent the seat back and is movable as needed between a stowed position with the tray table locked against the seat back and the top edge of the tray table resting just under the lateral bar, and a deployed position with the tray table lowered into a use position. These literature pockets are easier for both passengers and cleaning crews to access in addition to requiring less, weight-increasing material.

A vertical retention bar extends from a position near the lateral bar to a position near the bottom edge of the tray table when in the stowed position and cooperates with the lateral bar to retain the contents of the literature pocket in the pocket when the tray table is deployed for use. When the tray table is in the stowed position, the tray table itself further acts to retain the contents of the literature in the pocket.

Present aircraft cabins utilize overhead lights to provide lighting to passengers. These lights are typically incandescent halogen lights, which generate significant heat, require large amounts of energy and are prone to burnout, requiring replacement. These lights are typically mounted in an overhead console along with attendant call buttons and an oxygen container cover and are controlled either by a button next to the light or on an armrest. Lighting either to replace the overhead lights or to supplement overhead lighting would provide a benefit to the passengers, particularly if structures already in use for other purposes can be adapted to provide this lighting. In contrast to incandescent halogen lights, light emitting diode lighting elements generate far less heat, consume less electricity and have an extremely long service life. Light-emitting diode lighting elements typically do not "burnout" towards the end of their service life, but merely gradually change color temperature.

SUMMARY OF THE INVENTION

It is therefore an object of the present invention to provide a light fixture for use by an aircraft passenger.

It is another object of the invention to provide a light fixture that is positioned in front of a seated aircraft passenger.

It is another object of the invention to provide a light fixture that is mounted in the seat back of a passenger seat for use by an aft-seated passenger.

It is another object of the invention to provide a light fixture that is positioned in the area of a seat back literature pocket that is located at least partially behind a seat back tray table when in a stowed position.

It is another object of the invention to provide a light fixture that extends vertically downwardly from a lateral literature pocket bar positioned above a stowed seat back tray table.

It is another object of the invention to provide a light fixture mounted on a seat back of an aircraft passenger seat for use by an aft-seated passenger that provides light for both reading and to a deployed seat back tray table.

These and other objects and advantages of the invention are provided in an aircraft passenger seat that includes a seat back having a literature pocket defined by a lateral bar extending across a width of the seat back above a stowed tray table and a vertical retention bar light fixture extending downwardly from the lateral bar towards a deployed position of the tray table. The light fixture includes a light source powered by an electrical circuit to direct light into a space directly aft of the seat back for use by an aft-seated passenger.

BRIEF DESCRIPTION OF THE DRAWING FIGURES

Figure 2:
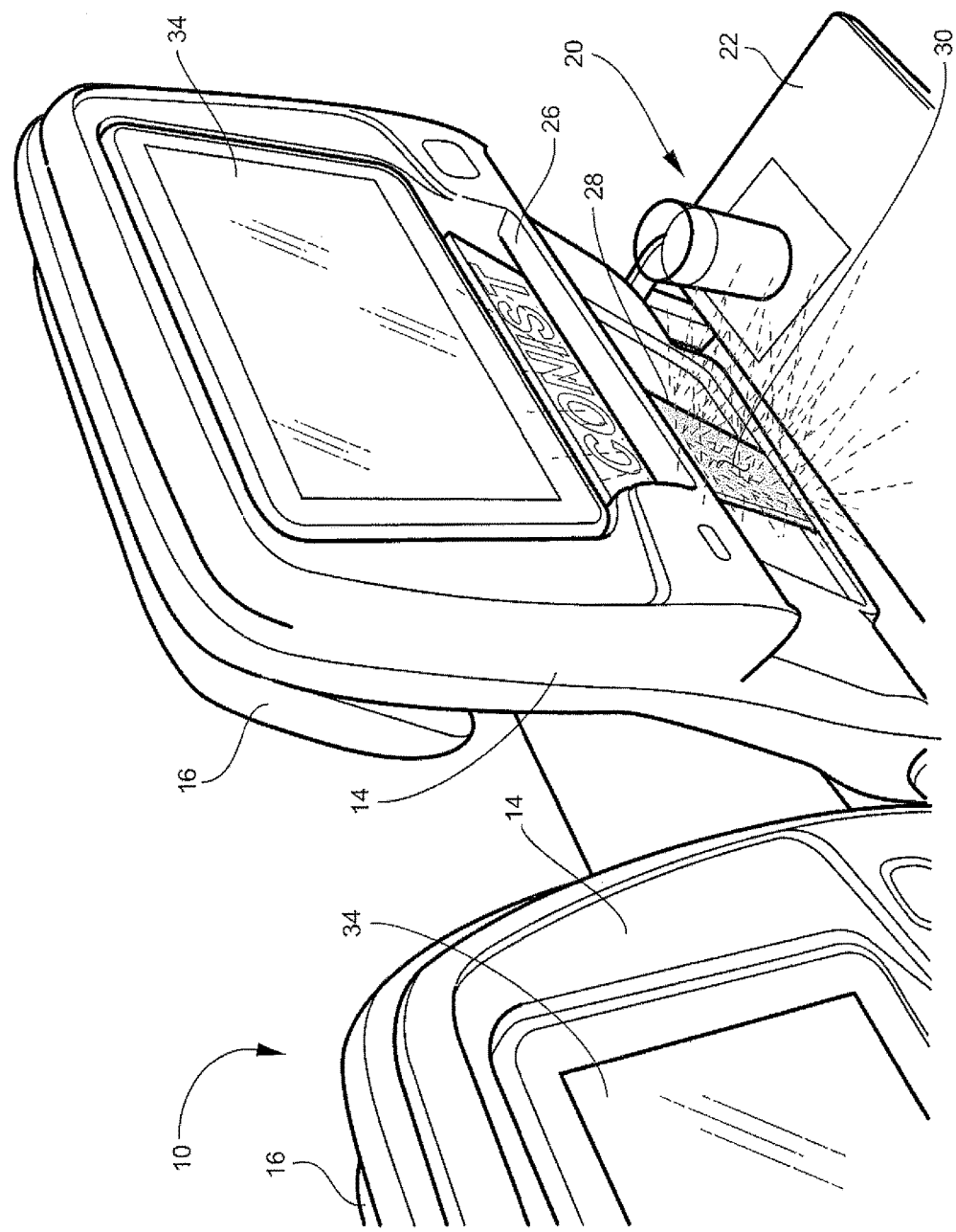

The present invention is best understood when the following detailed description of the invention is read with reference to the accompanying drawings, in which:

FIGS. 1 and 2 are perspective views of a seat back light fixture of an aircraft passenger seat.

DETAILED DESCRIPTION OF THE PREFERRED EMBODIMENT

Referring now to the drawings, FIG. 1 illustrates a conventional array of aircraft passenger seats of a type typically found in the main cabin of a commercial aircraft. Each seat 10 includes a cushioned seat bottom 12, seat back 14, headrest 16 and armrests 18. Each seat 10 also includes a tray table assembly 20 of the type that moves between a raised, stowed position shown in FIG. 1 and a lowered, deployed position, also shown in FIG. 1 and in FIG. 2. In the stowed position, the tray table 22 of the tray table assembly 20 resides in a locked condition against the aft side of the seat back 14. In this position, a literature pocket 24 is exposed above the stowed tray table 22 for use by a passenger seated in a seat aft of the seat back 14 and the literature pocket 24. A lateral retention bar 26 is exposed, which retains the contents of the literature pocket 24 in both the stowed and deployed positions of the tray table 22.

As shown with reference to the tray table 22 of FIGS. 1 and 2, when deployed, a vertical retention bar light fixture 28 extends from a position near the lateral retention bar 26 to a position near the bottom edge of the tray table 22 and cooperates with the lateral retention bar 26 to retain the contents of the literature pocket 24 when the tray table is deployed for use. The light fixture 28 preferably vertically bisects the lateral retention bar 26 and has a width that is approximately one-third the overall width of the lateral retention bar 26. The light fixture 28 is preferably recessed into the seat back 14 sufficiently so that when the tray table is stowed, it can reside flush against the seat back 14.

In accordance with the invention, the light fixture 28 includes an electrically connected array of light-emitting diode ("LED") lighting elements contained within the fixture 28 and covered by a clear plastic cover 30. The number of LEDs, the white light color definition, intensity and similar factors are variable and based on considerations such as the color of the overhead cabin and wash light in the surrounding area, spacing between the retention bar 28 and the tray table 22 and similar factors. Typical reading light values may be in the range of 300-500 lux, (lumen/m$^2$) with a range of 3600-5200K color temperature, or other values determined by government regulation and/or customer requirements.

The LED's are preferably dimmable, with a "night light" intensity of approximately 30-15 lux, (lumen/m$^2$). The LED lighting elements may be controlled manually by a switch on the in-flight entertainment ("ME") screen 34 or on the light fixture 28 itself. The light fixture 28 can be set to automatically switch to the "off" position when the tray table 22 is stowed, and the fixture 28 can be shrouded to direct light on the area of the seat back 14 above the lateral retention bar 24 when the tray table 22 is stowed.

The LED's may be spaced in one or more predetermined patterns within the fixture 28 and may be spaced within the entire area of the fixture 28 or may occupy less than the entire area of the fixture 28. Focusing lenses may be incorporated into the cover 30 to focus light in one or more directions, such as downwardly onto the tray table 22. A sensor 32 on top of the cover 30 senses the color, intensity and similar factors in the cabin and can adjust the lighting of the fixture 28 without being connected to a cable. Other options including running one or more strands of fiber optic lighting strips within the fixture 28 to create light "ribbons" of varying or alternating intensity and/or color. The fiber optic light can also be controlled by a computer or digital memory board to create images such as a logo. The clear plastic cover 30 may be a touch screen to control the LED's, or may be used to create moving patterns or to operate games incorporated into the fixture 28.

A passenger seat back light fixture according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. An aircraft passenger seat, comprising:
   a seat back;
   a tray table stowable against a backside of the seat back;
   a literature pocket disposed in the backside of the seat back, the literature pocket extending across a portion of a width of the seat back and comprising an elongate opening disposed above the tray table when stowed; and
   a light fixture fixed to the backside of the seat back in a recess behind the tray table when stowed, the light fixture being a part of the literature pocket and positioned to illuminate the recess and an area above the tray table when deployed, and the light fixture recessed within the backside of the seat back such that the tray table resides flush against the light fixture when the tray table is stowed.

2. The aircraft passenger seat of claim 1, further comprising an electrical circuit mounted on the literature pocket operable for powering the light fixture.

3. The aircraft passenger seat of claim 1, wherein the light fixture extends vertically from about the elongate opening of the literature pocket to about a top surface of the tray table when deployed.

4. The aircraft passenger seat of claim 1, further comprising a lateral retention bar disposed at the elongate opening of the literature pocket, the lateral retention bar and the light fixture cooperating to retain articles in the literature pocket when the tray table is deployed.

5. The aircraft passenger seat of claim 4, wherein light fixture vertically bisects the lateral retention bar and the light fixture has a width less than a total width of the lateral retention bar.

6. The aircraft passenger seat of claim 1, wherein the light fixture is a reading light comprising an array of light-emitting diodes.

7. The aircraft passenger seat of claim 1, wherein the light fixture operates in a range between 300-500 lux and a color temperature range between 3600-5200K.

8. The aircraft passenger seat of claim 1, wherein the light fixture automatically powers on when the tray table is deployed and automatically powers off when the tray table is stowed.

9. An aircraft passenger seat, comprising:
   a seat back;
   a tray table stowable against a backside of the seat back;
   a literature pocket disposed in a recess along the backside of the seat back, the literature pocket comprising a lateral retention bar disposed along an elongate opening of the literature pocket above the tray table when stowed, and a light fixture fixed to the seat back and extending vertically along the backside of the seat back spaced apart therefrom, the lateral retention bar and the light fixture cooperating to retain articles in the literature pocket, the light fixture arranged to illuminate the backside of the seat back and an area above the tray table when the tray table is deployed, and the light fixture recessed within the backside of the seat back such that the tray table resides flush against the light fixture when the tray table is stowed; and
   a video monitor disposed in the backside of the seat back above the elongate opening of the literature pocket.

10. The aircraft passenger seat of claim 9, further comprising an electrical circuit mounted on the literature pocket operable for powering the light fixture.

11. The aircraft passenger seat of claim 9, wherein the light fixture is a reading light comprising an array of light-emitting diodes.

12. The aircraft passenger seat of claim 9, wherein the light fixture operates in a range between 300-500 lux and a color temperature range between 3600-5200K.

13. The aircraft passenger seat of claim 9, wherein the light fixture automatically powers on when the tray table is deployed and automatically powers off when the tray table is stowed.

* * * * *